(12) United States Patent
Kawasaki

(10) Patent No.: US 7,090,069 B2
(45) Date of Patent: Aug. 15, 2006

(54) CIRCULATING TYPE FOOD AND DRINK TRANSPORT APPARATUS

(75) Inventor: Yoshiaki Kawasaki, Matto (JP)

(73) Assignee: System Create Co., Ltd., Ishikawa (JP)

( * ) Notice: Subject to any disclaimer, the term of this patent is extended or adjusted under 35 U.S.C. 154(b) by 0 days.

(21) Appl. No.: 11/115,183

(22) Filed: Apr. 27, 2005

(65) Prior Publication Data

US 2005/0189202 A1    Sep. 1, 2005

Related U.S. Application Data

(63) Continuation of application No. 10/756,365, filed on Jan. 14, 2004, now Pat. No. 6,935,489.

(30) Foreign Application Priority Data

Apr. 17, 2003   (JP)   ............................. 2003-112609

(51) Int. Cl.
    *B65G 45/24*   (2006.01)
(52) U.S. Cl. .................. 198/494; 198/831; 186/42
(58) Field of Classification Search ................ 198/831, 198/850–853, 493, 494; 186/38, 42, 43, 186/46
See application file for complete search history.

(56) References Cited

U.S. PATENT DOCUMENTS

| | | | |
|---|---|---|---|
| 1,973,750 A | | 9/1934 | De Kay |
| 2,666,519 A | | 1/1954 | Boots et al. |
| 2,689,638 A | | 9/1954 | Mojonnier et al. |
| 3,379,300 A | | 4/1968 | Karr |
| 3,554,360 A | | 1/1971 | Bildsoe et al. |
| 4,216,845 A | | 8/1980 | Tashman et al. |
| 4,226,325 A | * | 10/1980 | Vandas ..................... 198/493 |
| 4,765,440 A | | 8/1988 | Tashman |
| 4,938,866 A | * | 7/1990 | Ward ......................... 198/494 |
| 5,477,778 A | * | 12/1995 | Kuwahara ................. 186/42 |

* cited by examiner

*Primary Examiner*—James R. Bidwell
(74) *Attorney, Agent, or Firm*—Birch, Stewart, Kolasch, and Birch, LLP

(57) ABSTRACT

In circulating type food and drink transport apparatus (EQU), a plurality of plates (5A) is located on a circular link chain (4) including a chain driving section (DV) and a chain driven section (FR) with a predetermined clearance. The circular link chain is guided and carried by a traveling lane (1). The lower portion of the traveling lane is closed using a substantially U-shaped receiver (9). The chain driving section and the chain driven section are movable in accordance with a manual operation. The link chain is loosened, and thereby, the traveling lane (1) is securely cleaned.

6 Claims, 18 Drawing Sheets

CIRCULATING TYPE FOOD AND DRINK TRANSPORT APPARATUS

This application is a Continuation of application Ser. No. 10/756,365, filed on Jan. 14, 2004 now U.S. Pat. No. 6,935,489, and for which priority is claimed under 35 U.S.C. § 120; and this application claims priority of Application No. 2003-112609 filed in Japan on Apr. 17, 2003, under 35 U.S.C. § 119; the entire contents of all are hereby incorporated by reference.

BACKGROUND OF THE INVENTION

1. Field of the Invention

The present invention relates to circulating type food and drink transport apparatus, which is located along a customer's counter so that foods and drinks can be provided to customers using a series of plates circulating around a circular conveyor path.

2. Description of the Prior Art

Circulating type food and drink transport apparatus provides food and drink to customers using a series of plates circulating around a circular conveyor path. The circulating type food and drink transport apparatus is widely used in conveyor-belt sushi bars. In the circulating type food and drink transport apparatus, a predetermined clearance exists between adjacent plates. This is because of requiring a bent section used to form an infinitely circular conveyor path, and smoothly moving plates in the bent section.

However, the clearance exists between adjacent plates; for this reason, foreign matters such as rice and soup intrude into the circular conveyor path. The intruded foreign matters fall on the floor surface of the circulating type food and drink transport apparatus, and adhere to pipes included therein. As a result, these foreign matters remain as feeds for cockroaches and rats; for this reason, influence is given to the sanitary condition in shops.

In the circulating type food and drink transport apparatus, the link chain forms the circular conveyor path. For this reason, the circular conveyor path separates the space into inner and outer spaces. As a result, part of the lower side of the circular conveyor path must be provided with an open space, which is used as a passage for moving through inner and outer spaces.

However, the link chain is traveling on the passage; for this reason, shop clerks must pass through under the link chain in a state of being bent from their waist. For example, a handicapped shop clerk using a wheelchair can not use the passage. In addition, the following problems arise. More specifically, the circulating type food and drink transport apparatus is once located, and thereafter, it is impossible to newly locate large instruments in the inner space of the conveyor path. Likewise, it is impossible to remove machines and instruments from the inner space of the conveyor path.

SUMMARY OF THE INVENTION

The present invention has been made in view of the problems described above. An object of the present invention is to provide circulating type food and drink transport apparatus, which can always maintain sanitary conditions in shops. Another object of the present invention is to provide circulating type food and drink transport apparatus, which can readily separate a link chain so that shop clerks can freely go in and out inner and outer spaces of a circular conveyor path. Still another object of the present invention is to provide circulating type food and drink transport apparatus, which can form a passage without obstacles so that shop clerks can freely go in and out inner and outer spaces of a circular conveyor path.

In order to achieve the foregoing objects, according to an aspect of the present invention, there is provided circulating type food and drink transport apparatus (EQU) comprising: a circular link chain (4); a plurality of plates (5A) located on the link chain with a predetermined clearance; and a traveling lane (1) guiding and carrying the link chain, wherein the lower portion of the traveling lane is closed by a substantially U-shaped receiver (9).

Preferably, the link chain includes a chain driving section (DV) arranged at the corner of the traveling lane and a chain driven section (FR) arranged at another corner of the traveling lane, and a circular operation is made by the chain driving section and the chain driven section. The chain driving section and the chain driven section are movable in accordance with a manual operation.

The link chain is configured by a plurality of chain units (41) all having the same structure. In addition, the link chain includes a series of chain units (41) having the same structure and a separable chain unit (70) arranged at a proper position of the series of chain units (41).

Preferably, the separable chain unit is configured by an upper plate (5), a lower link arm (13), a hollow shaft (43) connecting lower and upper link arms (13); (5B), and a roller (44) rotating around the hollow shaft (43), and a link pin connecting the upper plate (5) and the lower link arm (13) has separable upper and lower portions.

Part (1A, 1B) of the traveling lane (1) is upwardly and downwardly foldable by the rotation around a hinge.

DETAILED DESCRIPTION OF THE INVENTION

Figure 1:
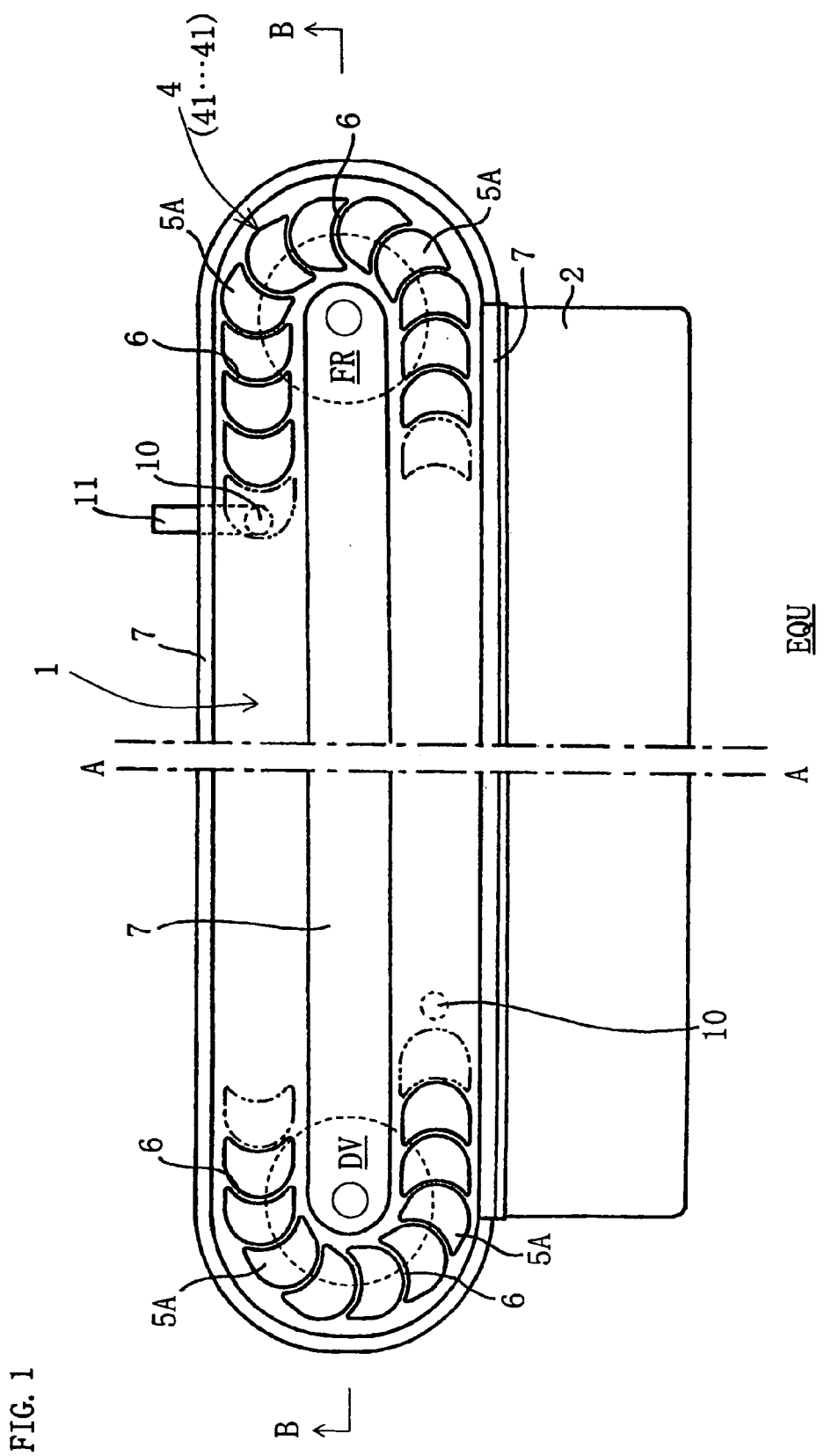
FIG. 1 is a schematic plan view showing circulating type food and drink transport apparatus according to one embodiment of the present invention.
Figure 2:
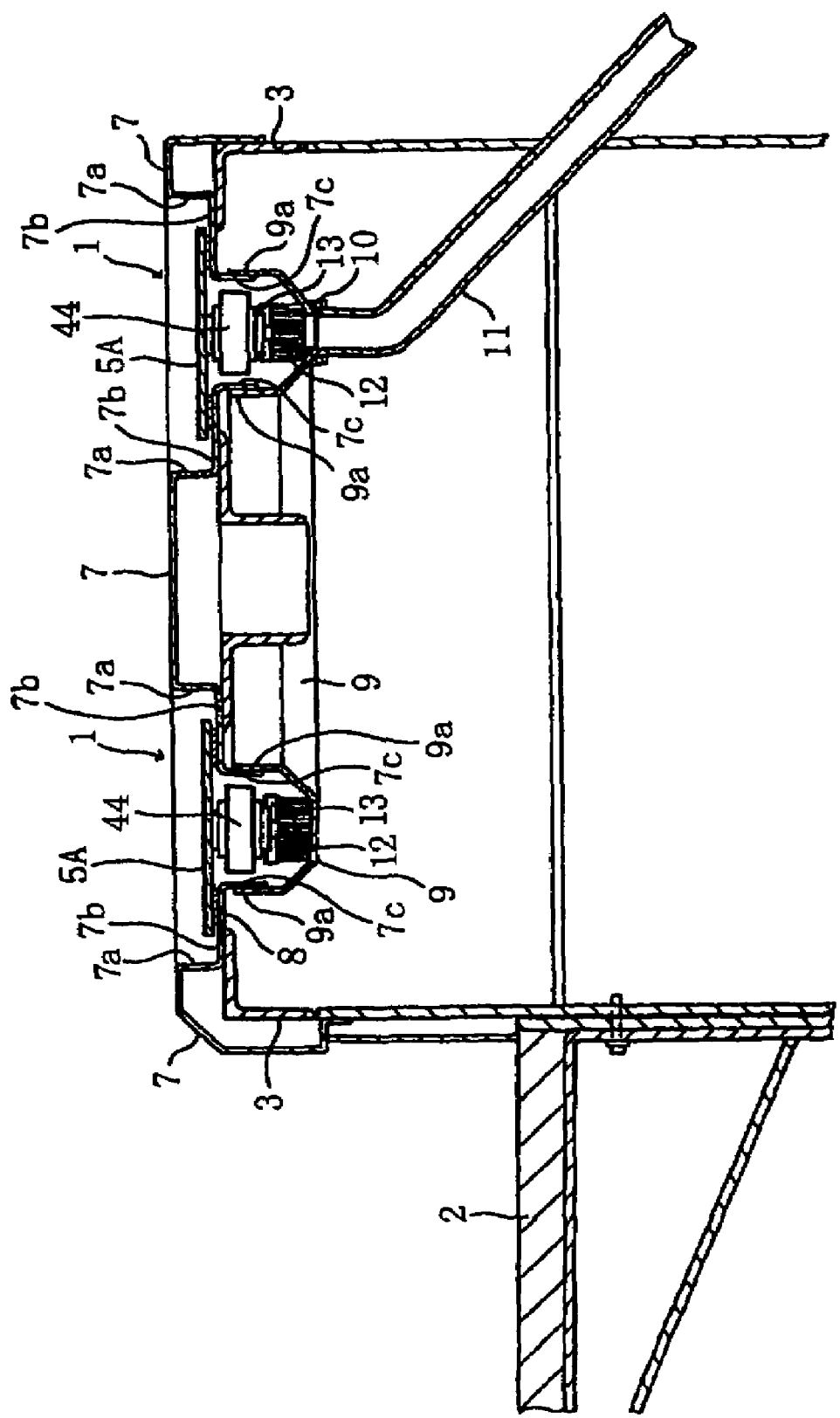
FIG. 2 is a schematic cross-sectional view taken along the line A—A of FIG. 1.
Figure 3:
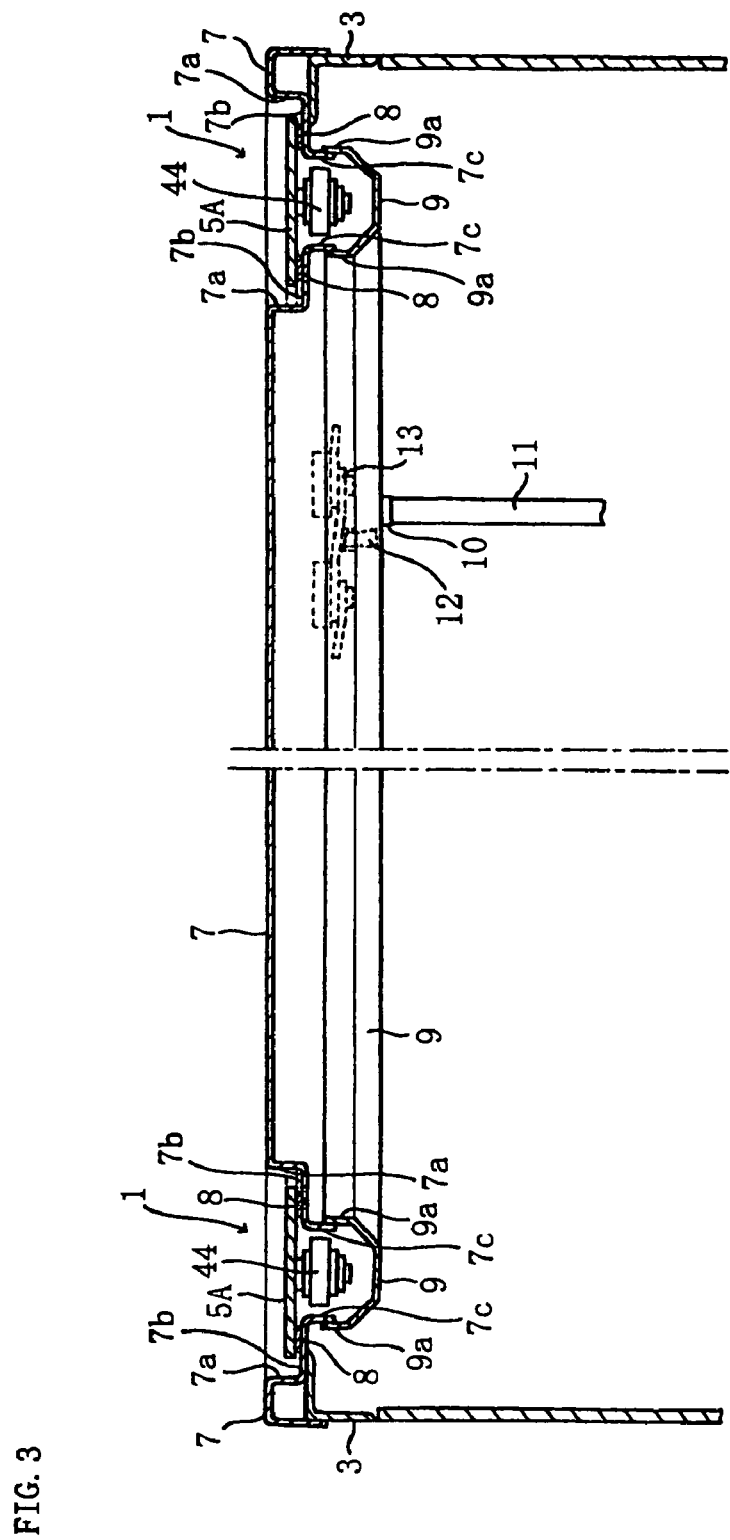
FIG. 3 is a schematic cross-sectional view taken along the line B—B of FIG. 1.

Embodiments of the present invention will be described below in detail with reference to the accompanying drawings. FIG. 1 is a schematic plan view showing circulating type food and drink transport apparatus EQU. FIG. 2 is a schematic cross-sectional view taken along the line A—A of FIG. 1. FIG. 3 is a schematic cross-sectional view taken along the line B—B of FIG. 1.

The circulating type food and drink transport apparatus EQU includes an elliptic traveling lane 1 (circular conveyor path) having U-shaped folded both ends, and a customer's counter 2 located outside the traveling lane 1. A link chain 4 moves along the traveling lane 1 supported to a frame 3. According to the present embodiment, a chain driving section DV is arranged at the left side of the traveling lane 1 while a chain driven section FR is arranged at the right side thereof.

Figure 5A:
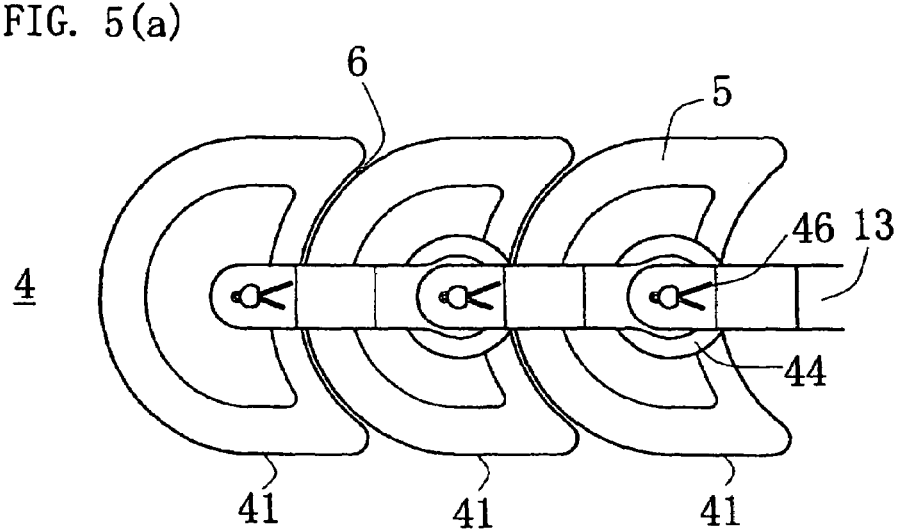
FIG. 5A is a view showing the back surface of a link chain.
Figure 5B:
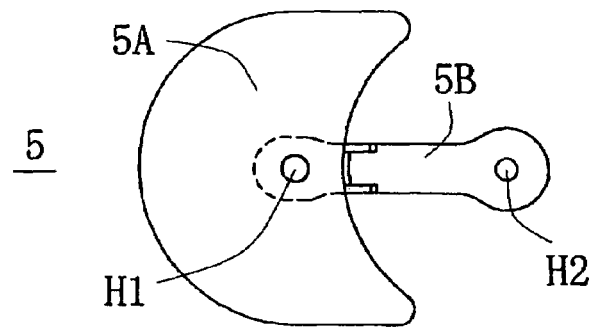
FIG. 5B is a view showing an upper plate.
Figure 5C:
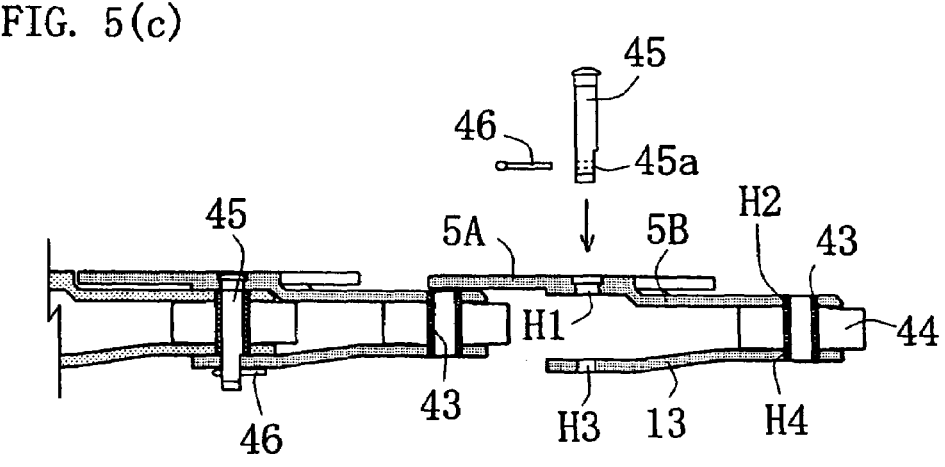
FIG. 5C is a view to explain the method of linking a chain unit.
Figure 6:
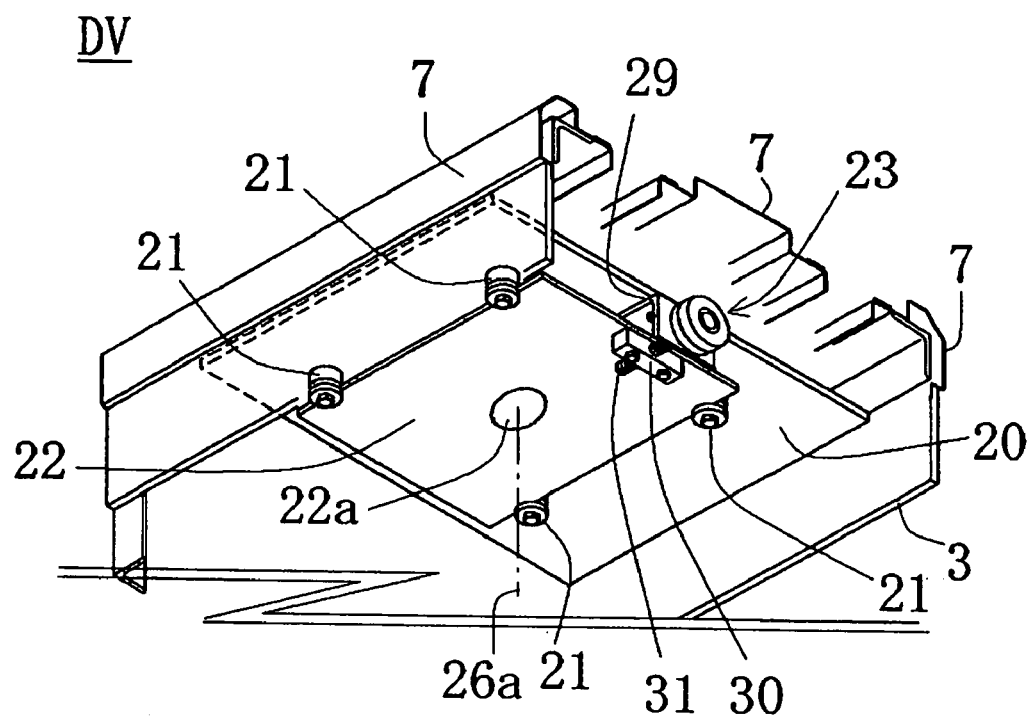
FIG. 6A is a perspective view showing the internal structure of a chain driving section.
FIG. 6B is a view to explain a partial member of the chain driving section.
Figure 6:
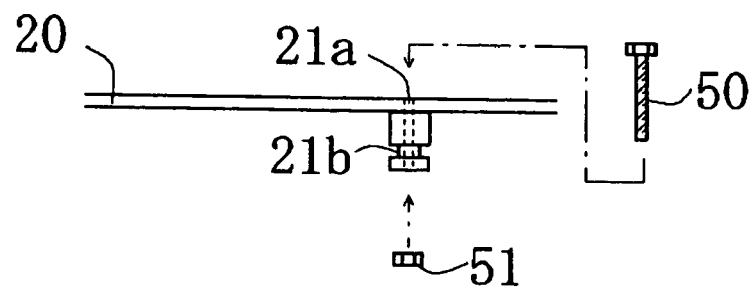
Figure 7:
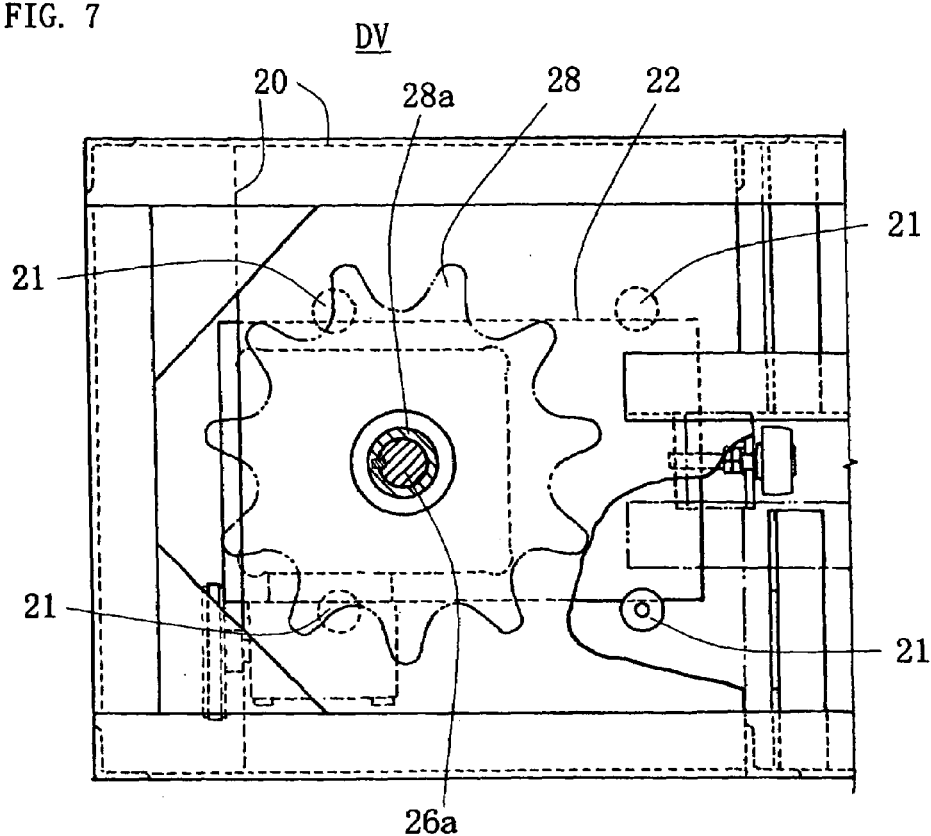
FIG. 7 is a plan view showing the chain driving section.

As shown in FIG. 5A, the link chain 4 is configured in a manner that a large number of chain units 41 having the same structure are connected. As illustrated in FIGS. 5B and 5C, each chain unit 41 is configured by an upper plate 5, long-plate lower link arm 13, hollow shaft 43 and roller 44. More specifically, the upper plate 5 is configured by a half-moon plate 5A and an upper link arm 5B, which are integrated with each other. The hollow shaft 43 links the lower link arm 13 with the upper link arm 5B. The roller 44 rotates around the hollow shaft 43.

The proximal sides of the half-moon plate 5A and the upper link arm 5B are individually formed with vertical through holes H1 and H2. The proximal and distal sides of the lower link arm 13 are formed with vertical through holes H3 and H4, respectively. The through holes H1 and H3 are formed at the position corresponding to each other. Likewise, the through holes H2 and H4 are formed at the position corresponding to each other. These through holes H2 and H4 are fitted with the hollow shaft 43 rotatably holding the roller 44.

In order to connect two neighboring chain units 41A and 41B, the hollow shaft 43 of the front chain unit 41A is positioned between through holes H1 and H3 of the rear chain unit 41B, as shown in FIG. 5C. A link pin 45 is inserted through the through hole H1, hollow shaft 43 and through hole H3 (see the arrow shown in FIG. 5C). Thereafter, a split pin 46 is inserted into a diametrical hole 45a formed at the distal end of the link pin 45, and thereby, the connection of front and rear chain units 41A and 41B is completed.

In the connected state, a predetermined clearance 6 is formed between neighboring half-moon plates 5A of the upper plate 5 in order to allow continuous chain units 41A and 41B to freely bend. Dishes for putting food and drink and other containers are placed on each half-moon plate 5A of the link chain 4 having the structure described above.

As seen from FIGS. 2 and 3, the traveling lane 1 is provided with a guide wall 7 at each of outer and inner circumferential sides of the conveyor path. The guide wall 7 is formed into an L-shape having continuously connected vertical and horizontal portions 7a and 7b. A vertical portion 7c is continuously connected to the horizontal portion 7b so as to extend downwardly. The vertical portions 7a of inner and outer circumferential sides and the vertical portions 7c thereof face each other via the link chain 4. A pair of guide plates 8 is fixed to the horizontal portion 7b along the conveyor path of the traveling lane 1. The vertical portion 7c of the guide wall 7 is provided with a rubbish receiver 9 having a substantially U-shaped cross section, and thereby, the lower side of the traveling lane 1 is closed. Thus, even if foreign matters come in from the clearance between the upper plates 5, they do not fall on the floor. In cleaning, water can be supplied to the rubbish receiver 9. In addition, dust on the floor is not stirred up to the position of the link chain 4.

The rubbish receiver 9 is properly provided with a discharge port 10, which connected with a discharge pipe 11. In the present embodiment, two discharge ports 10 are provided; however, the present invention is not limited thereto. In order to always make clean the rubbish receiver 9, it is preferable to fix a cleaning brush 12 to part of the series of chain units 41. In the embodiment, the cleaning brush 12 has a number of brushes projecting from the flat proximal portion. The proximal portion of the cleaning brush 12 is fixed to the lower link arm 13 of the specified chain unit 41. As seen from FIG. 2, the link chain 4 is attached with two cleaning brushes 12 in total.

In the link chain 4 attached with the cleaning brushes 12, the tip of the cleaning brush 12 moves in a state of contacting with the bottom surface of the rubbish receiver 9 together with the circular motion of the link chain 4. Therefore, foreign matters fallen in the rubbish receiver 9 is carried to the discharge port 10, and thereafter, discharged from there.

Figure 4:
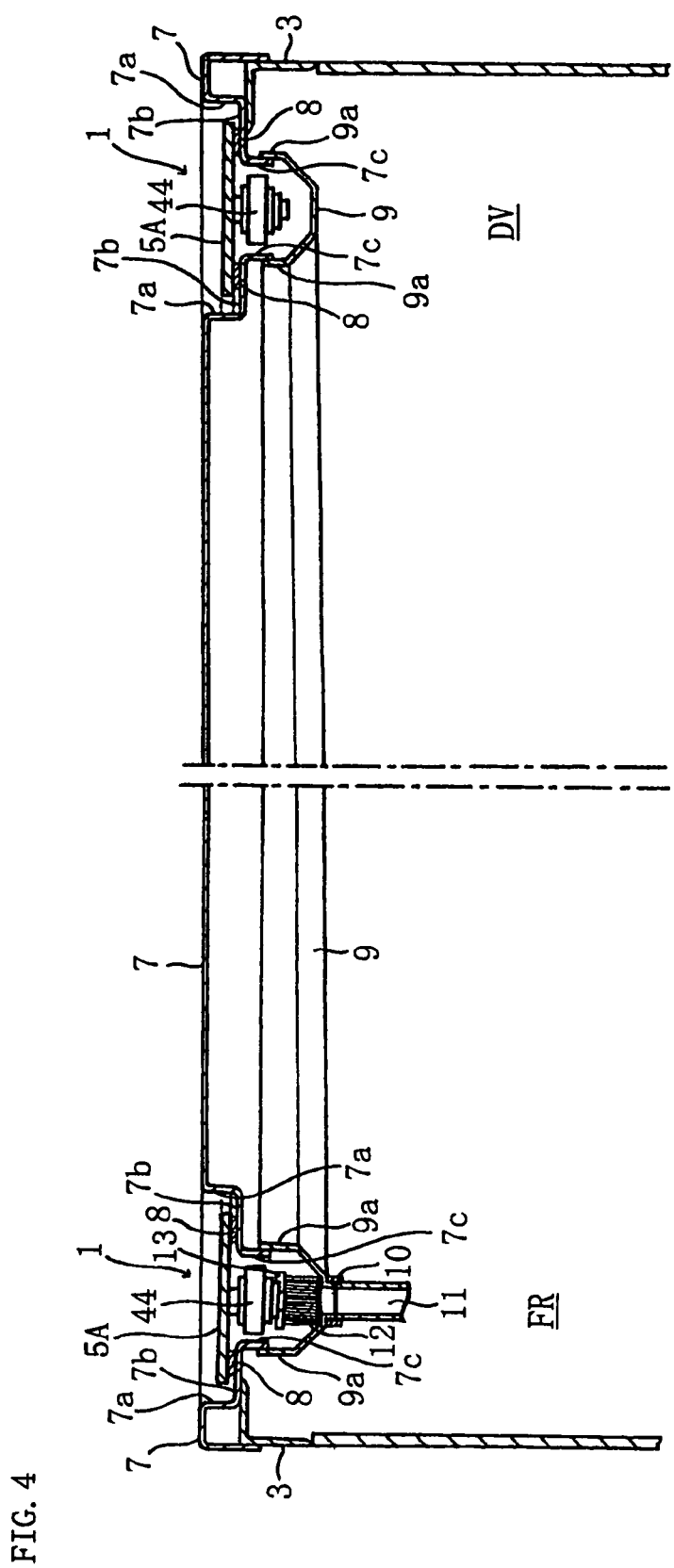
FIG. 4 is a schematic cross-sectional view showing another structure of a receiver.

FIG. 4 shows another structure of the rubbish receiver 9. More specifically, the rubbish receiver 9 is attached in a slightly inclined state. In FIG. 4, the right side including the chain driving section DV is set slightly higher than the left side including discharge port 10, discharge pipe 11 and chain driven section FR. Therefore, when water is supplied from the chain driving section in cleaning, foreign matters pushed out by the water is carried to the discharge port 10 via the inclined rubbish receiver 9, and thus, discharged from the discharge pipe 11.

In the foregoing embodiment, it is preferable to lift up the link chain 4 so that the traveling lane 1 can be fully cleaned, as the need arises. In order to lift up the link chain 4, the traveling path of the link chain 4 must be shortened so that the link chain 4 can be loosened. FIGS. 6 to 11 are views to explain the structure of arbitrarily shortening the traveling lane 1.

FIG. 6A shows principal parts of the movable chain driving section DV. As shown in FIG. 6A, the chain driving section DV is configured by fixed plate 20, moving plate 22, operating member 23 and rotary driving member 24 (not shown in FIG. 6A). More specifically, the fixed plate 20 is attached to the frame 3, and the moving plate 22 is supported by four slide bosses 21 mounted to the fixed plate 20. The operating member 23 manually slides the moving plate 22, and the rotary driving member 24 is fixed to the moving plate 22.

Figure 8:
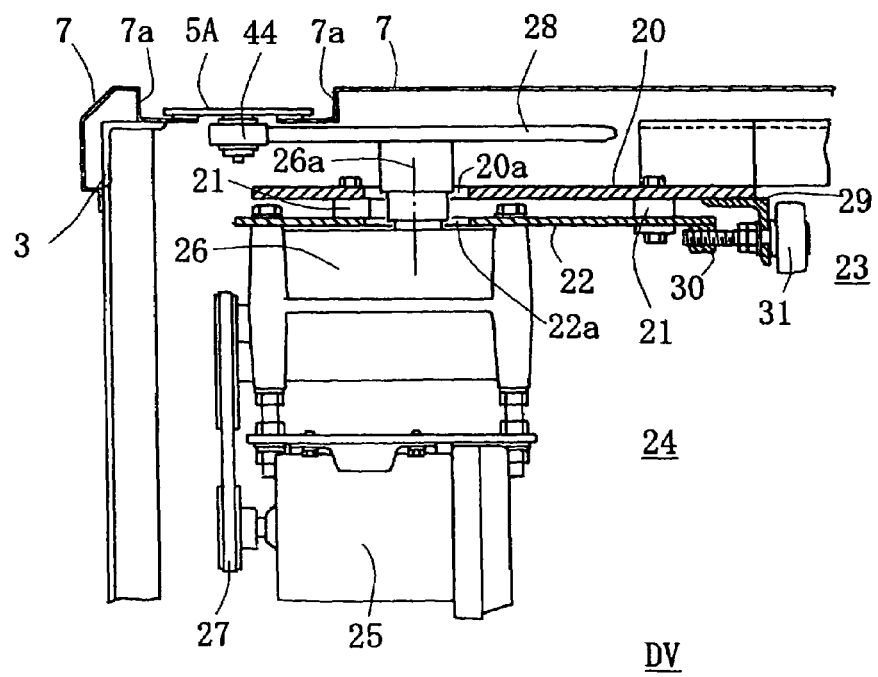
FIG. 8 is a right side view showing the chain driving section.
Figure 9:
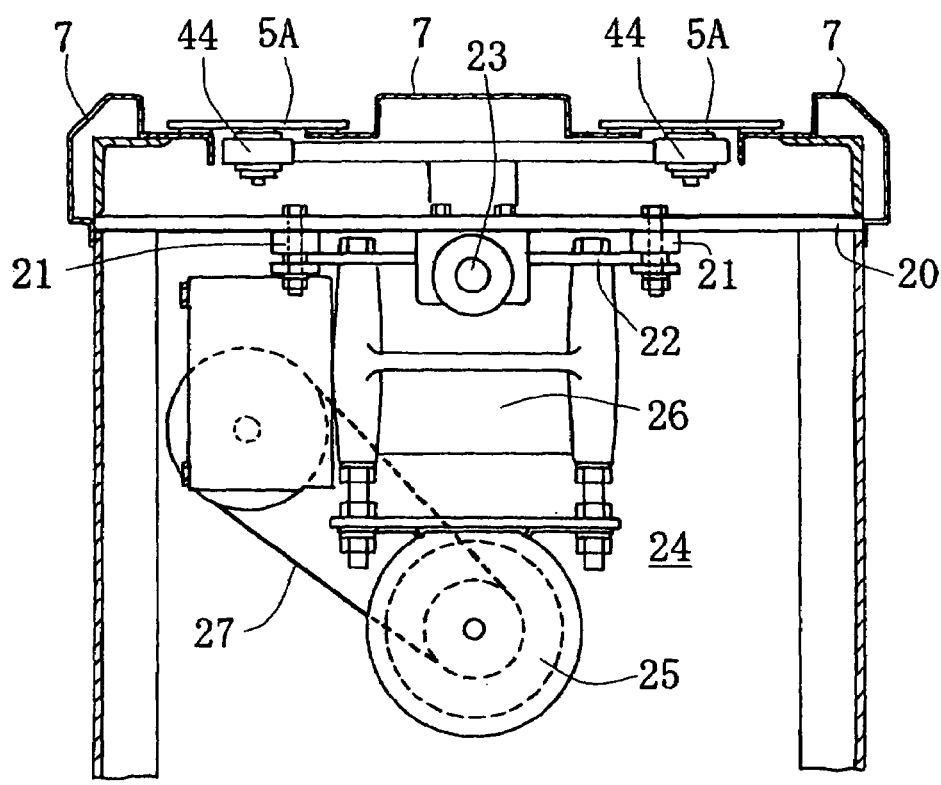
FIG. 9 is a front view showing the chain driving section.

As shown in FIG. 8, the rotary driving member 24 is configured by a rotary motor 25 and a reduction gear 26 connected by a V belt 27. An output shaft 26a of the reduction gear 26 projects into the upper portion of the fixed plate 20 through opening holes 22a and 20a formed at the center of moving and fixed plates 22 and 20. The projected output shaft 26a is fixed with the center hole 28a of a driving sprocket 28 (see FIG. 7).

The slide boss 21 is made of a brass cylindrical rod, and formed with an axial through hole 21a at the center and a small-diameter portion 21b at the axial center, as shown in FIG. 6B. The slide boss 21 is attached to the fixed plate 20 using a bolt 50 and a nut 51. The circumferential edge of the moving plate 22 is engaged with each small-diameter portion 21b of four slide bosses 21 so that the moving plate 21 can be slidably held.

As shown in FIGS. 6A and 8, the operating member 23 is configured by L-shaped plate 29, travel nut 30 and control knob 31. More specifically, the L-shaped plate 29 is fixed to the lower surface of the moving plate 20. The travel nut 30 is fixed to the moving plate 20, and the control knob 31 is screwed into the travel nut 30 through the plate 29. In this case, the control knob 31 is freely rotated in the circumferential direction; however, it is not moved in the axial direction.

As shown in FIG. 6A, the travel nut 30 is formed into a rectangular shape. The travel nut 30 is formed with a female screw groove corresponding to a male screw of the control knob 31. The plate 29 is fixed to the fixed plate 20; on the other hand, the travel nut 30 is movable integrally with the moving plate 22. Thus, when rotating the control knob 31, the male screw of the control knob 31 is engaged with the female screw of the travel nut 30, and thereby, the moving plate 22 is moved to the axial direction of the control knob 31. As is evident from FIG. 6A, the moving plate 22 moves while sliding the small-diameter portion 21b of the slide boss 21.

Figure 10:
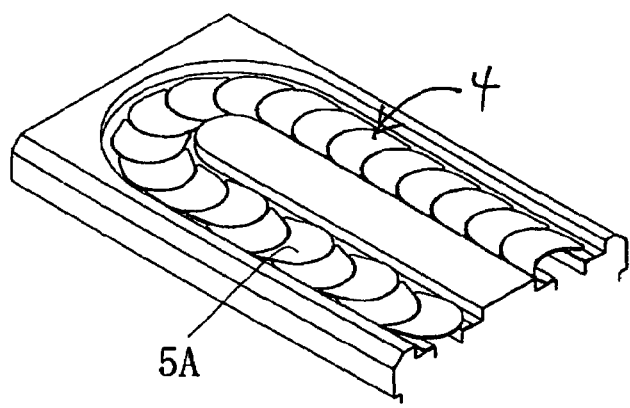
FIG. 10 is a view showing a loose link chain.

In the embodiment, when the control knob 31 is rotated in the clockwise direction, the moving plate 22 is moved to the right direction of FIG. 8. In accordance with the foregoing movement, the rotary driving member 24 including the driving sprocket 28 is moved to the right direction. As a result, the conveyance path of the link chain 4 is shortened; therefore, the link chain 4 is loose (see FIG. 10). The loose link chain 4 is left up, and thereby, it is possible to clean the rubbish receiver 9. If the link chain 4 elongates due to aged deterioration as shown in FIG. 10, the control knob 31 is rotated to make long the conveyance path, and thereby, the entire length of the link chain 4 can be set to the same as the conveyance path length thereof.

Figure 11A:
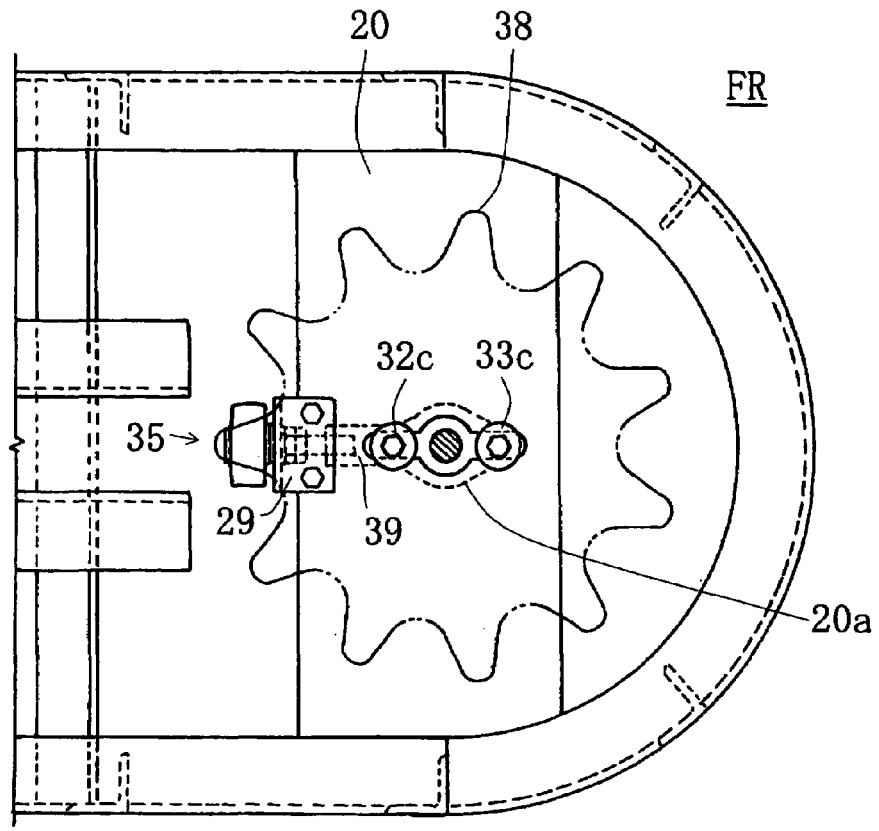
FIGS. 11A and 11B are plan view and front view showing a chain driven section, respectively.
Figure 11B:
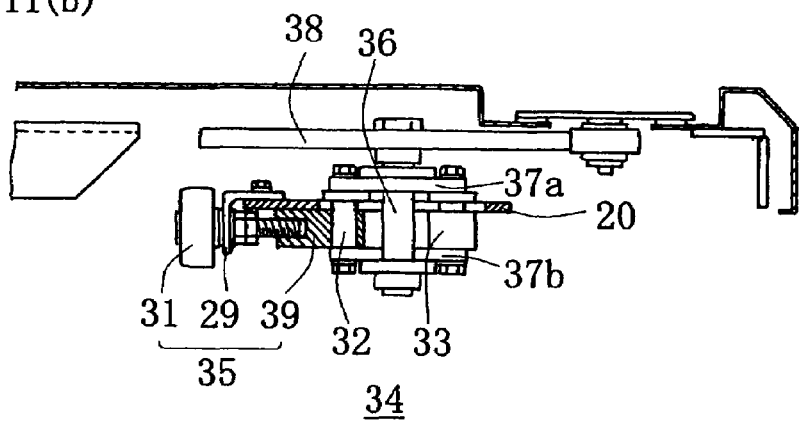

FIG. 11 shows principal parts of the movable chain driven section FR. The chain driven section FR has no rotary driving member; therefore, it is lighter than the chain driving section DV. Thus, the chain driven section FR has the structure slightly different from FIGS. 6 to 9. More specifically, the chain driven section FR is mainly configured by narrow-width fixed plate 20 attached to the frame 3, driven rotary member 34 and operating member 35. The driven rotary member 34 is attached to the fixed plate 20 via two slide bosses 32 and 33. The operating member 35 manually slides the driven rotary member 34. The fixed plate 20 is formed with a substantially elliptic hole 20a at the center. The circumferential edge of the hole 20a is engaged with heads 32c and 33c of slide bosses 32 and 33, and thereby, the driven rotary member 34 hangs.

The driven rotary member 34 is mainly configured by inner and outer wheels 36, 37a and 37b relatively rotating via a bearing, and a sprocket 38 rotating integrally with the inner wheel 36. Brass slide bosses 32 and 33 are interposed between upper and lower outer wheels 37a and 37b.

Figure 11C:
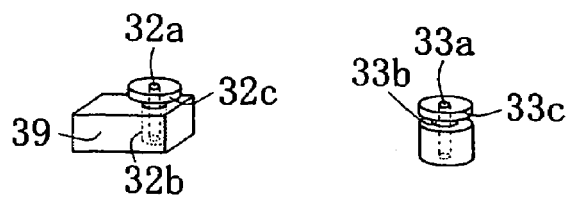
FIG. 11C is a view to explain a partial member of the chain driven section.

As shown in FIG. 11C, the slide boss 33 is formed into a cylindrical rod. The slide boss 33 is formed with an axial through hole 33a at the center, and a small-diameter portion 33b at the axial center. Further, the slide boss 33 has a large-diameter head portion 33b at the upper portion. The small-diameter portion 33b receives the elliptically circumferential edge 20a of the fixed plate 20. The head portion 33c is engaged with the circumferential edge 20a of the fixed plate 20.

The slide boss 32 is formed into a cylindrical rod. The slide boss 32 is formed with an axial through hole 32a at the center. However, a small-diameter portion 32b axially extends. Therefore, the slide boss 32 has a large-diameter head portion 32c and the small-diameter portion 32b. As shown in FIG. 11C, the small-diameter portion 32b is inserted and held in a take-up nut 39. The circumferential edge 20a of the fixed plate 20 is fitted into the clearance between the take-up nut 39 and the head portion 33c of the slide boss 33. By doing so, the head portion 32c is engaged with the circumferential edge 20a of the fixed plate 20.

The operating member 35 is configured by L-shaped plate 29 fixed to the fixed plate 20, take-up nut 39 arranged below the plate 29, and control knob 31 screwed into the take-up nut 39 through the plate 29.

The take-up nut 39 is formed with a female screw groove corresponding to the male screw of the control knob 31. The plate 29 is fixed to the fixed plate 20; on the other hand, the take-up nut 39 is attached to the fixed plate 20 together with the driven rotary member 34.

When the control knob 31 is rotated, the male screw of the control knob 31 is screwed into the female screw of the take-up nut 39. Thus, the take-up nut 39 and the driven rotary member 34 are moved to the axial direction of the control knob 31. More specifically, the lower surface of the head portions 32c and 33c of the slide bosses 32 and 33 move while sliding on the upper surface of the fixed plate 20. As described above, the control knob 31 is rotated, and thereby, the take-up nut 39 and the driven rotary member 34 are slidably moved to the left direction of FIG. 11B. Therefore, the link chain 4 is slag.

The link chain 4 of the chain driven section FR is loosened in addition to the chain driving section DV. By doing so, cleaning is securely performed in a state of lifting up the link chain 4. Even if the link chain 4 elongates due to aged deterioration as shown in FIG. 10, the conveyor path of the link chain 4 is made long to coincide with the entire length thereof.

In the embodiment, the same chain unit 41 is used. In this case, a separable chain unit (see FIGS. 17 and 19) may be used at a proper place between the series of chain units 41. The separable chain unit is used, and thereby, the link chain 4 can be readily separated on the way thereof. Therefore, the link chain 4 is removed, so that the traveling lane 1 can be entirely cleaned. The separable chain unit will be explained later with reference to another embodiment shown in FIG. 12.

Figure 12:
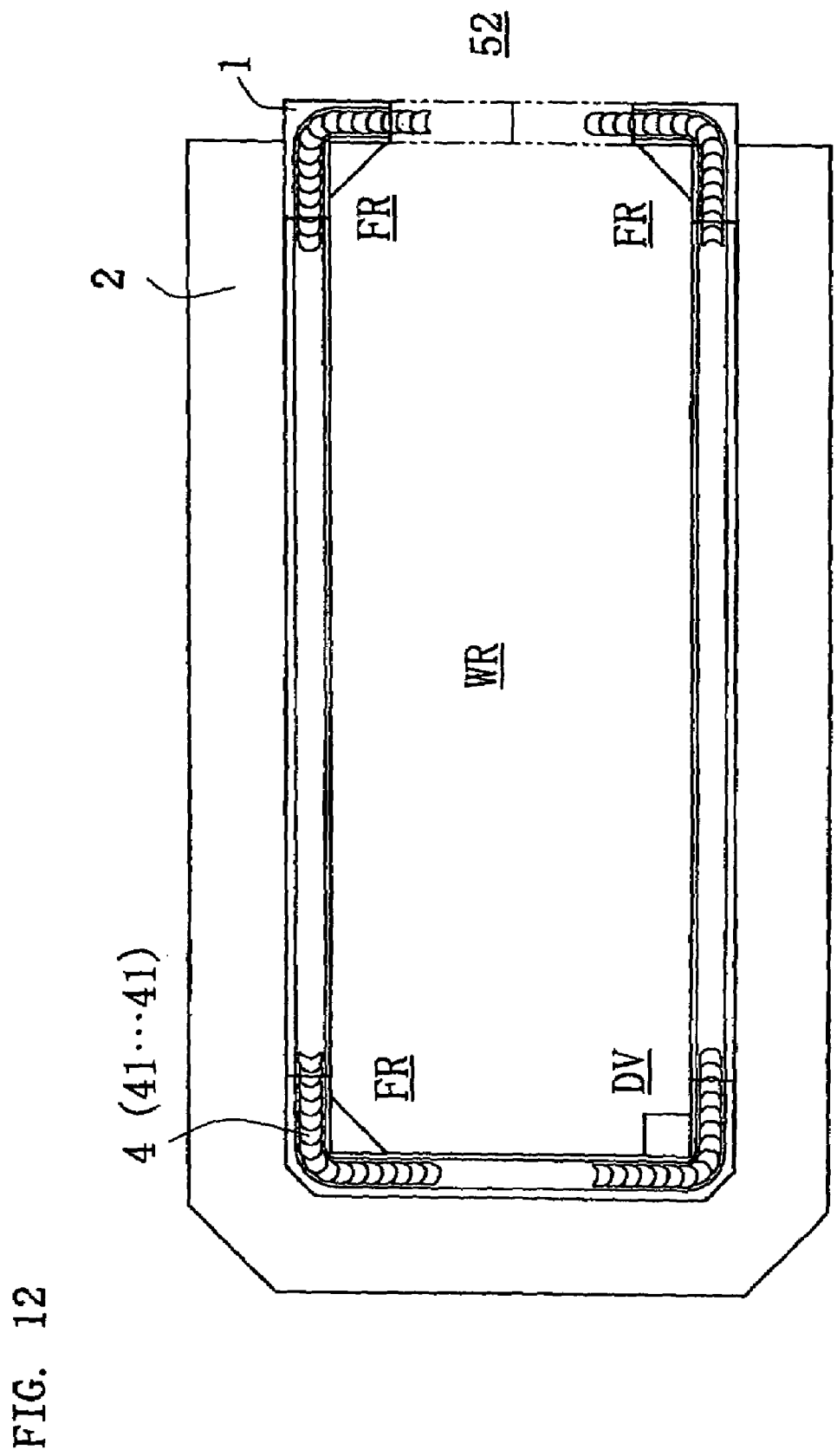
FIG. 12 is a schematic plan view showing circulating type food and drink transport apparatus according to another embodiment of the present invention.

FIG. 12 is a plan view showing circulating type food and drink transport apparatus having a conveyor path of the link chain 4 wider than the case of FIG. 1. As shown in FIG. 12, there is shown a rectangular traveling lane 1 formed of one chain driving section DV and three chain driven sections FR. A C-shaped customer counter 2 is arranged outside the traveling lane 1 to be aligned with the rectangular shape.

The traveling lane 1 has an opening and closing gate 52 so that shop clerks can go in and out. The link chain 4 configured by the large number of chain units 41 is separable at the gate 52. The chain driving section DV and the chain driven section FR is slidably moved. As a result, the traveling lane 1 is readily cleaned, and suitable steps are taken against aged deterioration of the link chain.

Figure 13A:
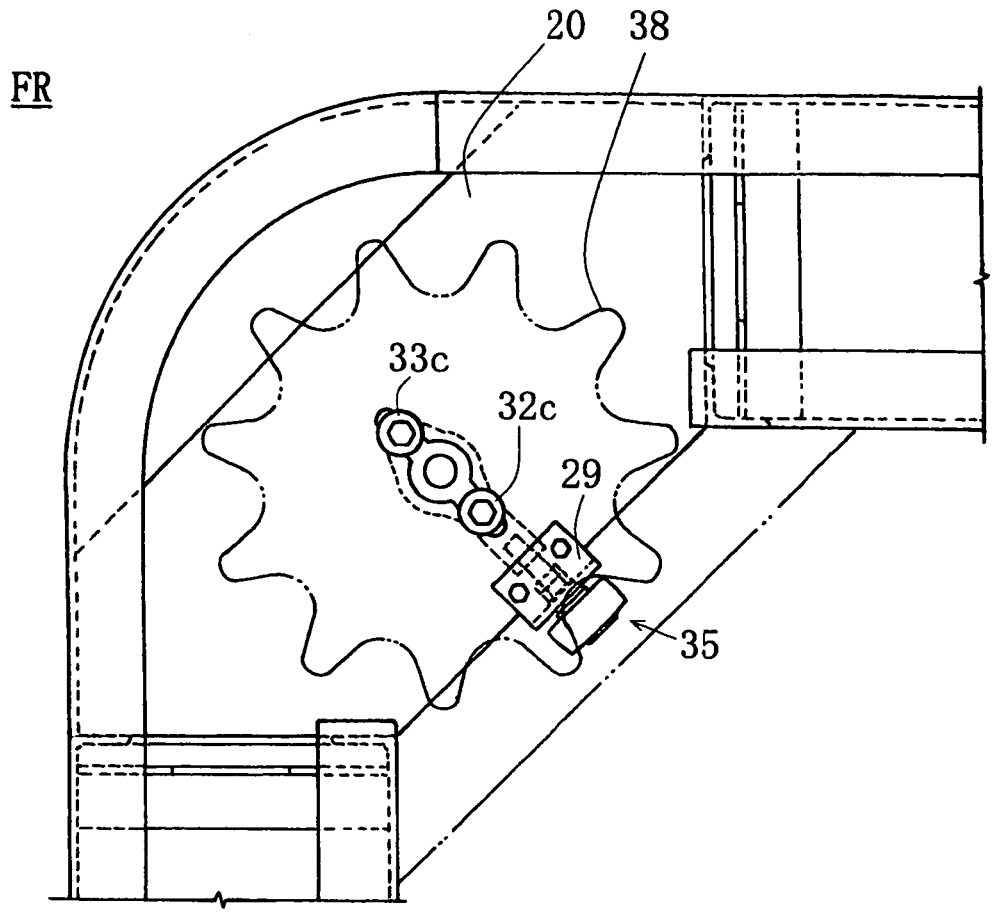
FIGS. 13A and 13B are plan view and front view showing a chain driven section, respectively.
Figure 13B:
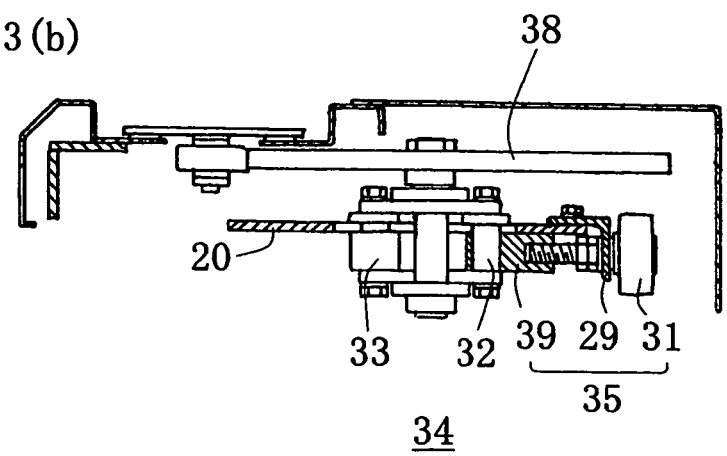

FIG. 13 shows the structure of the chain driven section FR of FIG. 12; in this case, the structure is substantially the same as the chain driven section FR of FIG. 11. More specifically, the chain driven section FR is mainly configured by slightly wide fixed plate 20 attached to the frame 3, driven rotary member 34 and operating member 35. The driven rotary member 34 is attached to the fixed plate 20 via two slide bosses 32 and 33. The operating member 35 manually slides the driven rotary member 34.

Figure 14:
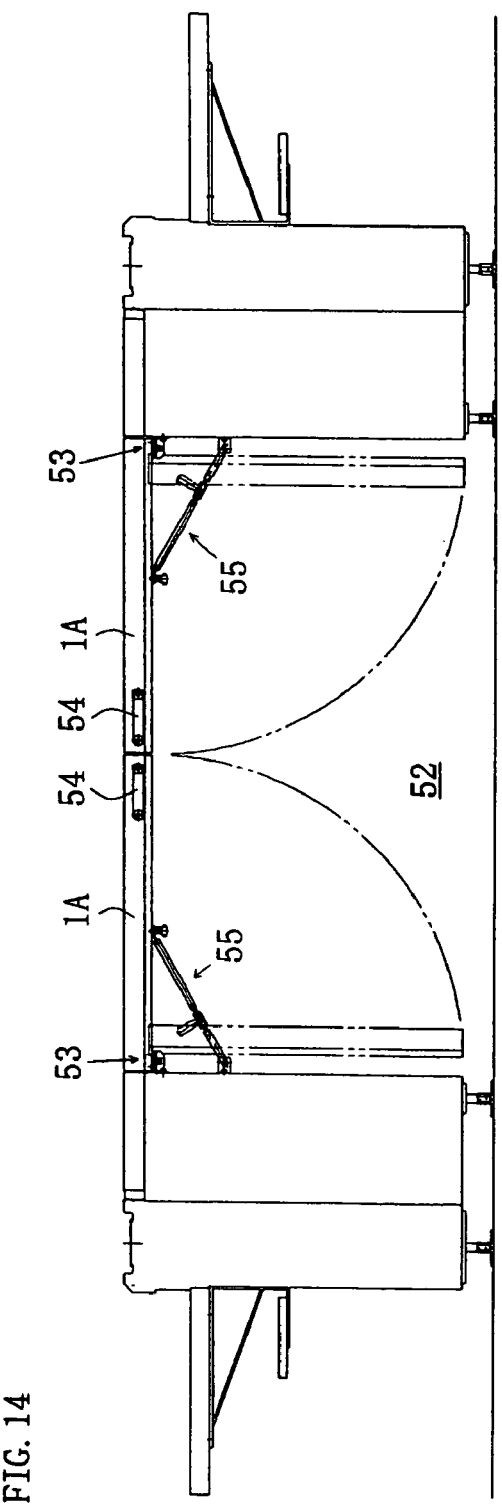
FIG. 14 a right side view showing the chain driving section shown in FIG. 12.

As described before, the traveling lane 1 is partially separable so that clerk can freely go in and out the work space WR as the need arises, in the embodiment of FIG. 12. FIG. 14 is a right side view schematically showing the gate 52 of FIG. 12. As shown in FIG. 14, the gate 52 is provided with a foldable lane 1A, which is foldable using a hinge 53 as a fulcrum. Right and left foldable lanes 1A and 1A are provided with a U-shaped operating handle at their distal end.

As shown in the solid line of FIG. 14, the foldable lane 1A is kept at the horizontal state by a support member 55 when the circulating type food and drink transport apparatus EQU is operating. As shown in the dashed line of FIG. 14, when the circulating type food and drink transport apparatus EQU is not operated, the foldable lane 1A is folded using the hinge 53 as a fulcrum.

Figure 15:
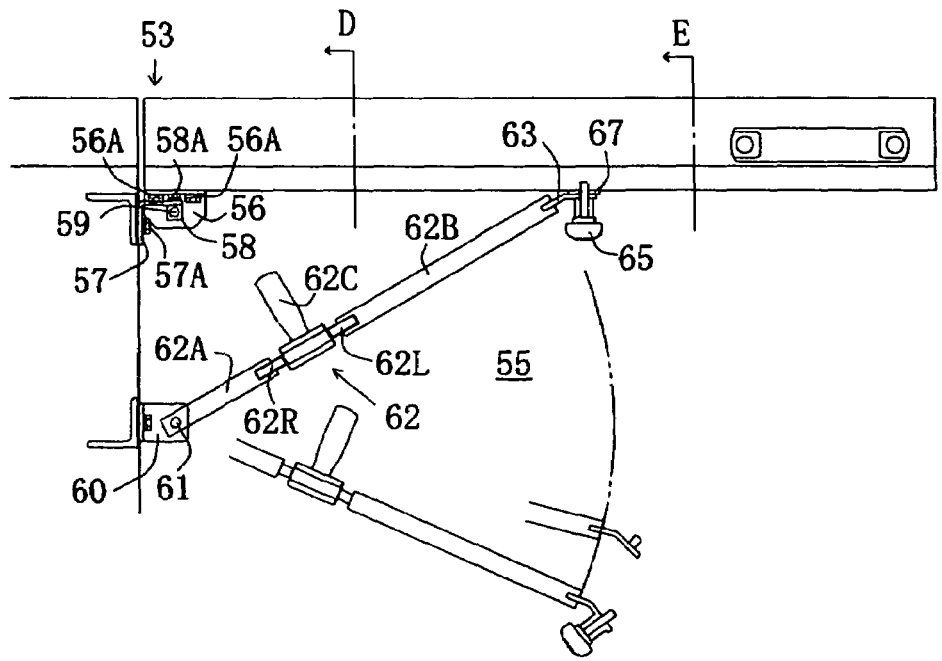
FIG. 15 is a view showing part of FIG. 14.
Figure 16A:
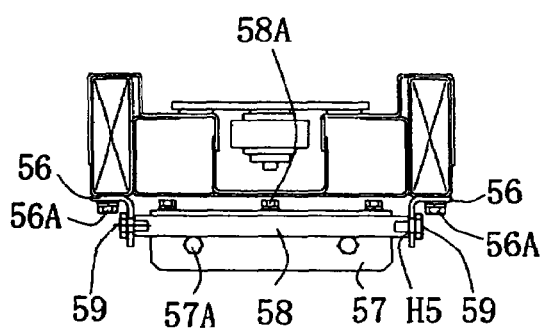
FIG. 16A is a cross-sectional view when being viewed from the line E of FIG. 15.
Figure 16B:
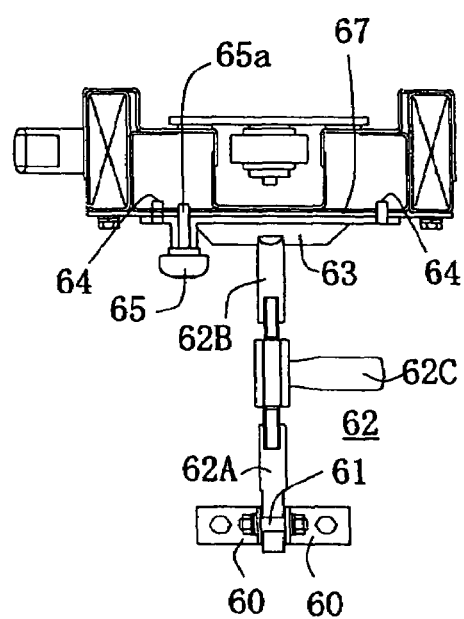
FIG. 16B is a cross-sectional view when being viewed from the line D of FIG. 15.

FIGS. 15, 16A and 16B are views to explain parts of the foldable lane 1A. FIG. 16A is a schematic right view when being viewed from the line D of FIG. 15, and FIG. 16B is a schematic right view when being viewed from the line E of FIG. 15.

As shown in FIGS. 15 and 16A, the hinge 53 is configured by two fixed brackets 56, wide bracket 57, square rod 58 and pins 59. Two fixed brackets 56 are fixed to the lower horizontal surface of the lane, and the wide bracket 57 is fixed to the vertical surface of the frame 3. The square rod 58 is fixed to the wide bracket 57, and the pins 59 are screwed into both ends of the square rod 58. Each fixed bracket 56 is fastened using two screws 56A while the wide bracket 57 is fastened using two screws 57A. The square rod 58 is fixed using three screws 58A.

The brackets 56 and 57 both have a substantially L-shaped cross section. The wide bracket 57 has approximately the same length as the square rod 58. The fixed bracket 56 is formed with a through hole H5 for passing the pin 59 through there. The pin 59 passes the through hole H5 to be screwed into the square rod 58. In this case, even if the pin 59 is inserted by the limit position, a gap is formed between the pin 59 and the square rod 58. Thus, the fixed bracket 56 and the foldable lane 1A integrated therewith are rotatable around the pin 59.

A shown in FIGS. 15 and 16B, the support member 55 is configured by bracket 60, extendable rod 62, bent plate 63 fixed to the distal end of the extendable rod 62, positioning pins 64 and bolt 65. The extendable rod 62 is rotatable around the pin 61 held by the bracket 60. The positioning pins 64 project from both ends of the bent plate 63. The bolt 65 has a screw shaft 65a passing through the bent plate 63.

The extendable rod 62 is configured by two round rods 62A, 62B, and a handle 62C connecting these round rods. Two screw shafts 66R and 66L projecting from the handle 62C are screwed into round rods 62A and 62B, respectively. The screw shaft 66R is a right screw while the screw shaft 66L is a left screw, Thus, the handle 62C is rotated, and thereby, the extendable rod 62 is freely extendable to the axial direction.

The bottom surface of the foldable lane 1A is provided with a long plate 67 corresponding to the structure of the support member 55. The long plate 67 is formed with holes for receiving the positioning pins 64 and a screw hole for receiving the screw shaft 65a.

The operation of the foldable lane 1A having the structure described above will be described below. Before the circulating type food and drink transport apparatus EQU is operated, the foldable lane 1A is in a folded state. In this state, the support member 55 is slightly shorter as compared with the operation mode supporting the foldable lane 1A.

In the above-mentioned state, the foldable lane 1A and the extendable rod 62 are manually lifted up. Thereafter, the positioning pin 64 at the distal end of the extendable rod 62 is inserted into the hole of the long plate 67. The handle 62C is rotated so that the extendable rod 62 can be extend, and thereby, the foldable lane 1A is pushed up in accordance with the extension of the extendable rod 62. When the foldable lane 1A becomes the horizontal state, the screw shaft 65a of the bolt 65 is fitted into the screw hole of the long plate 67. Thereafter, the bolt 65 is rotated so that the foldable lane 1A and the support member 55 can be fixed.

When the operation of the circulating type food and drink transport apparatus EQU is completed, the bolt 65 is rotated so that the fixing state of the foldable lane 1A and the support member 55 can be released. The extendable rod 62 is slightly shortened, and thereafter, the positioning pin 64 is removed from the hole of the long plate 67. By doing so, the foldable lane 1A and the support member 55 are in a free state, and thereafter, they are intactly kept in the folded state.

In this state, the link chain 4 configured by connecting the large number of chain units 41 is in the same horizontally extended state as the operation mode. For this reason, the link chain 4 must be partially separated. In order to simplify the foregoing work, it is preferable to use a special chain unit 70 different from FIGS. 5A to 5C.

Figure 17A:
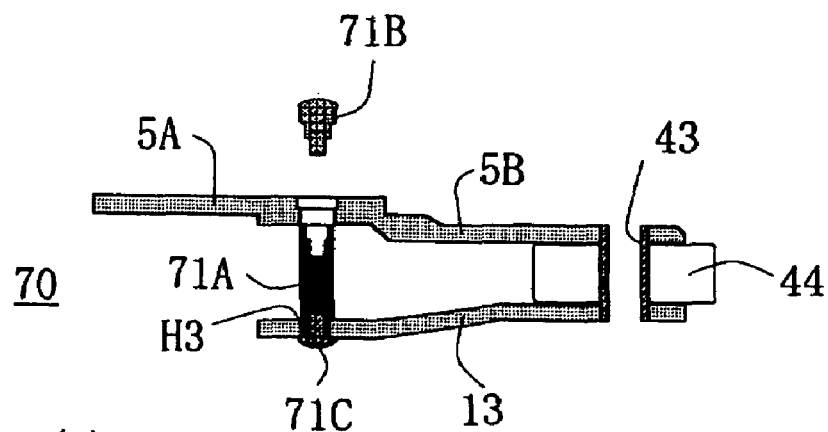
FIGS. 17A to 17C are views to explain a separable chain unit.
Figure 17B:
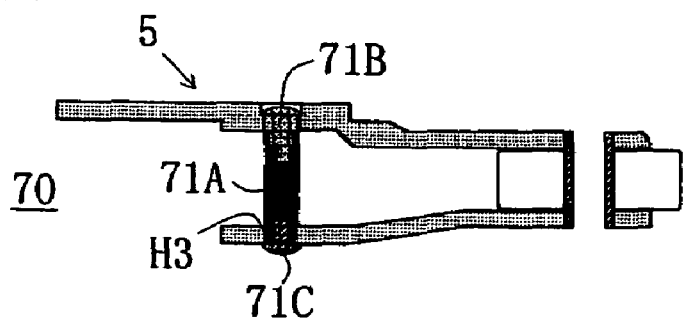
Figure 17C:
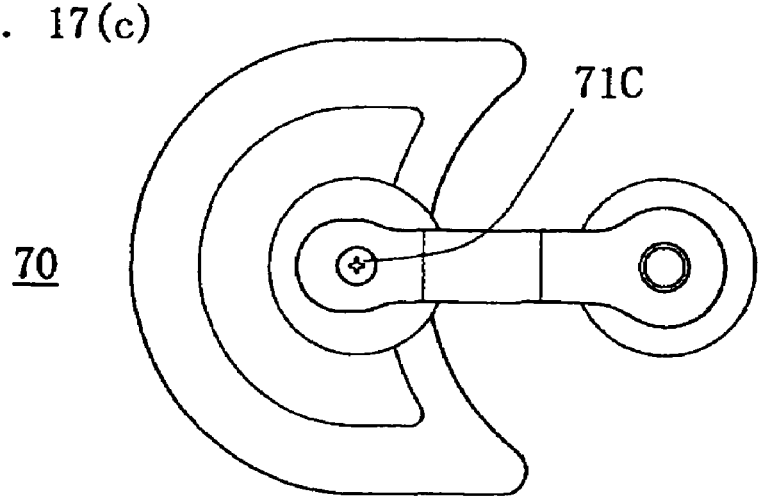

FIGS. 17A to 17C show a chain unit 70 for simplifying the work of separating the link chain 4. In the circulating type food and drink transport apparatus EQU shown in FIG. 12, the chain unit 70 shown in FIGS. 17A to 17C is used together with the chain unit 41 shown in FIGS. 5A to 5C every several meters. As shown in FIG. 17A, the chain unit 70 is the same as the chain unit 41 of FIG. 5C in the structure of including upper plate 5 (5A, 5B), lower link arm 13, hollow shaft 43 and roller 44.

However, in the chain unit 70, a link pin 71 is configured by three members. More specifically, the link pin 71 is configured by pin body 71A having upper and lower screw holes, upper fastening screw 71B and lower fastening pin 71C. The pin body 71A is inserted into the through hole H3 of the lower link arm 13, and the lower fastening pin 71C is screwed thereto from the lower side of the lower link arm 13. By doing so, the foregoing pin body 71A, lower link arm 13 and fastening screw 71C are integrated.

In this state, the top surface of the pin body 71A contacts with the lower surface of the upper plate 5. However, the upper plate 5 is rotated around the hollow shaft 43, and thereby, the upper portion of the pin body 71A of the link pin is opened. Therefore, the hollow shaft 43 of another chain unit 41 is inserted into the opened-state pin body 71A, and thereby, two (front and rear) chain units are linked with each other.

Considering the explanation, the method of separating the link chain 4 linking the large number of chain units 41 near the gate 52 will be explained below. The chain unit 70 exists in the chain units 41 every several meters; therefore, it is traveled to the gate 52, and detected there. In order to simplify the detection work, it is preferable to give specific marks to the side of the chain unit 70.

Figure 18A:
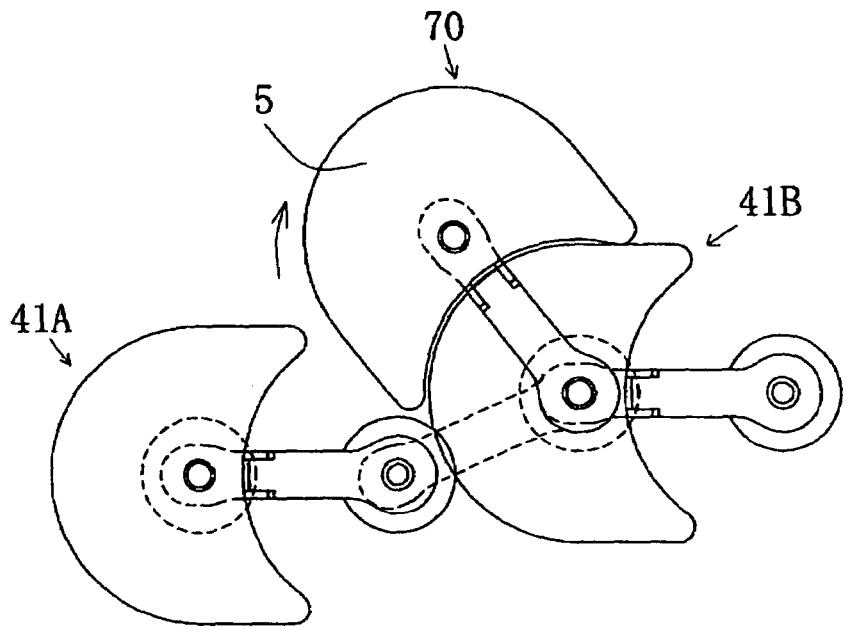
FIGS. 18A to 18C are views to explain the method of separating the chain unit shown in FIGS. 17A to 17C.
Figure 18B:
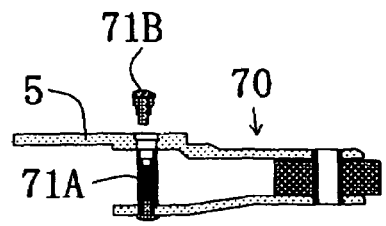
Figure 18C:
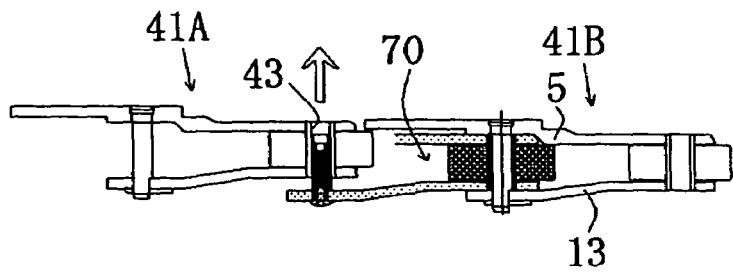

In either case, when the chain unit 70 is detected, the upper fastening screw 71B is first removed (see FIG. 18B). In FIG. 18B, there is shown no chain units 41A and 41B placed front and rear the chain unit 70. As shown in FIG. 18A, the upper plate 5 of the chain unit 70 is rotated so that the upper portion of the pin body 71A can be opened. Thereafter, as shown in FIG. 18C, the hollow shaft 43 of the front chain unit 41 is removed from the pin body 71A. By doing so, the chain unit 41A is separated from the chain unit 70; therefore, the linking state of the link chain 4 can be released.

In the manner described above, the linking state of the link chain 4 is released. Thus, the link chain 4 is separated in a state of hanging down, and thereby, the gate 52 is fully opened. Incidentally, when linking the separated link chain 4, the operation reverse to the separating work described before is carried out. The above has described the structure of the separable link chain 4. The present invention is not limited to the foregoing structure, and various modifications may be made.

Figure 19A:
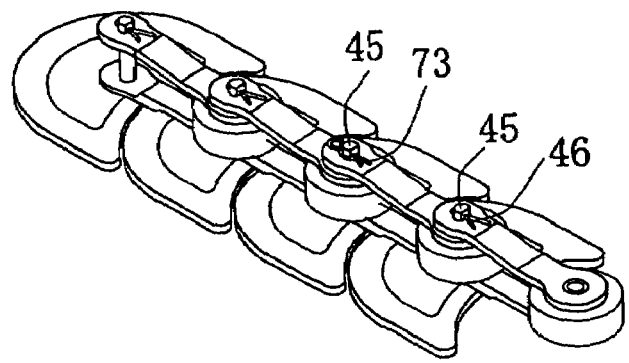
FIGS. 19A to 19D are views showing another separable chain unit.

As illustrated in FIG. 19A, an elastic pin 73 is used in place of the split pin 46 shown in FIG. 5A. by doing so, it is possible to realize the separable link chain 4 using only chain units 41 having the same structure. The pin 73 is not removed from the link pin 45 so long as it does not receive external force; however, the pin 73 is removed from the link pin 45 without using tools by strongly pulling it.

Figure 19B:
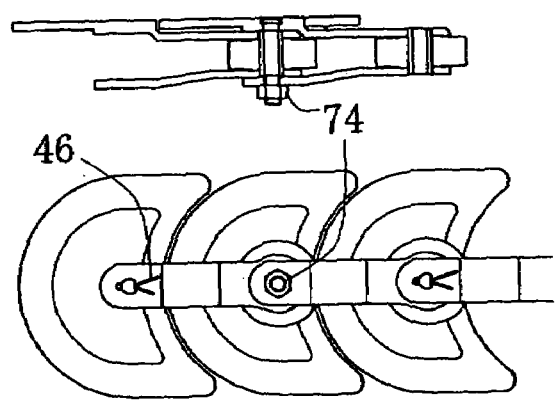
Figure 19C:
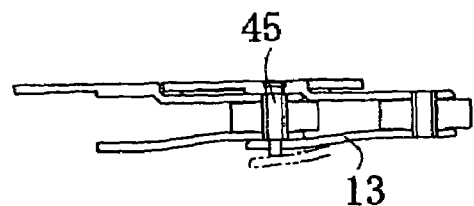
Figure 19D:
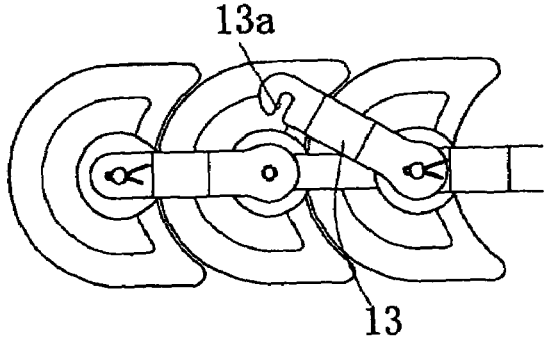

As shown in FIG. 19B, the distal end of the link pin 45 is provided with a screw groove, and thereby, the use of a nut 74 is possible. The nut 74 is removed, and thereafter, the link pin 45 is pulled up. Since the distal end of the link pin 45 has sufficient length, the link pin 45 is merely inserted if the link chain is held by the friction with the lower link arm 13. In this case, as shown by the dashed line in FIG. 19C, the lower link arm 13 is pushed down, and thereafter, the link pin 45 is pulled up. As depicted in FIG. 19D, the distal end of the lower link arm 13 may be formed with a slit 13a, which is engaged with the distal portion of the link pin 45.

Figures 20A, 20B:
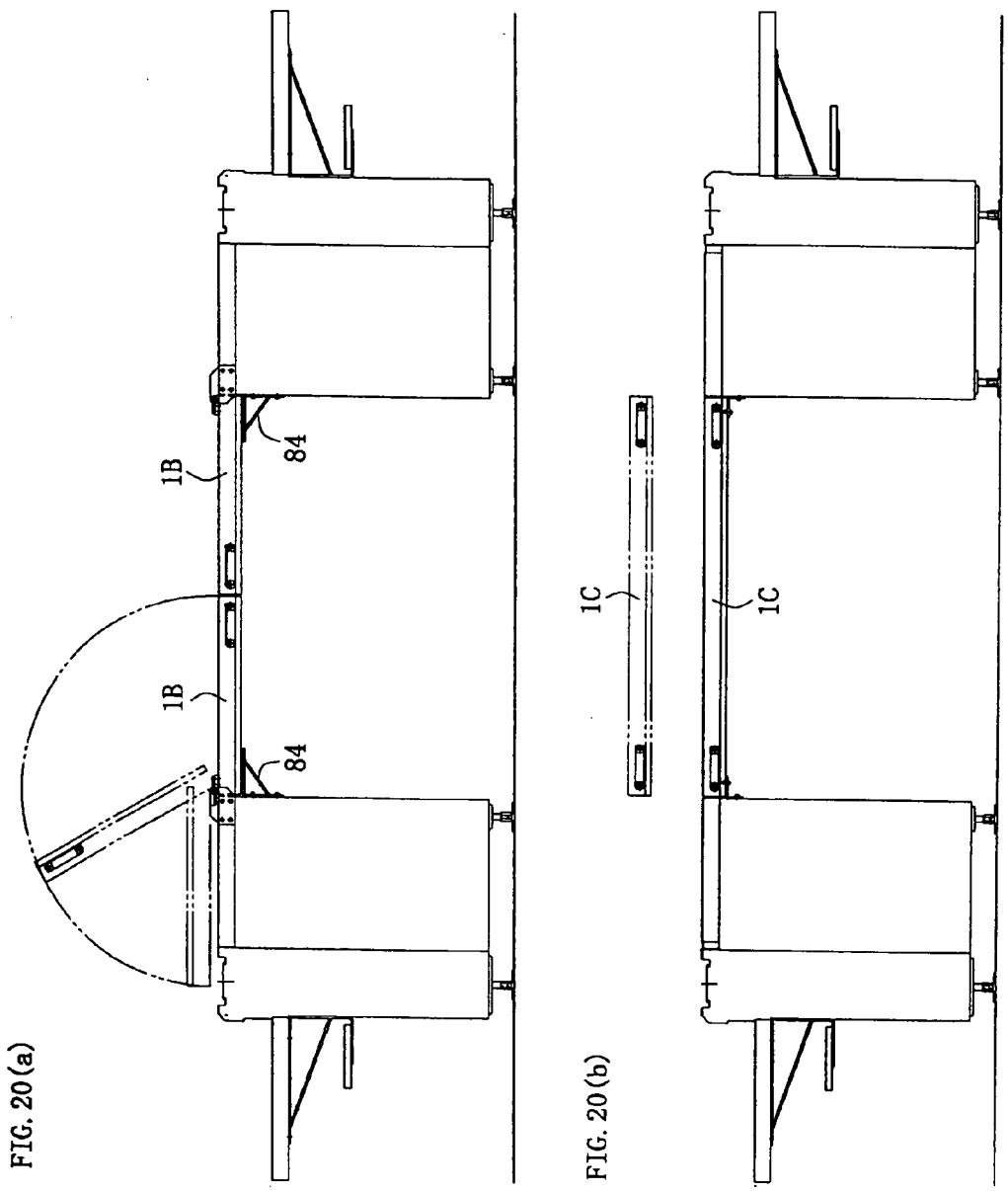
FIGS. 20A and 20B are views showing the structure different from FIG. 14.

The structure of the foldable lane 1A may be properly modified. For example, as shown in FIG. 20A, a foldable lane 1B may be upwardly folded. In this case, the link chain 4 must be separated; for this reason, it is preferable to use both chain unit 41 and chain unit 70 shown in FIGS. 17A to 17C. A lane 10 shown in FIG. 20C may be used in place of foldable lanes 1A and 1B. The lane 1C is partially removable.

Figures 21A, 21B:
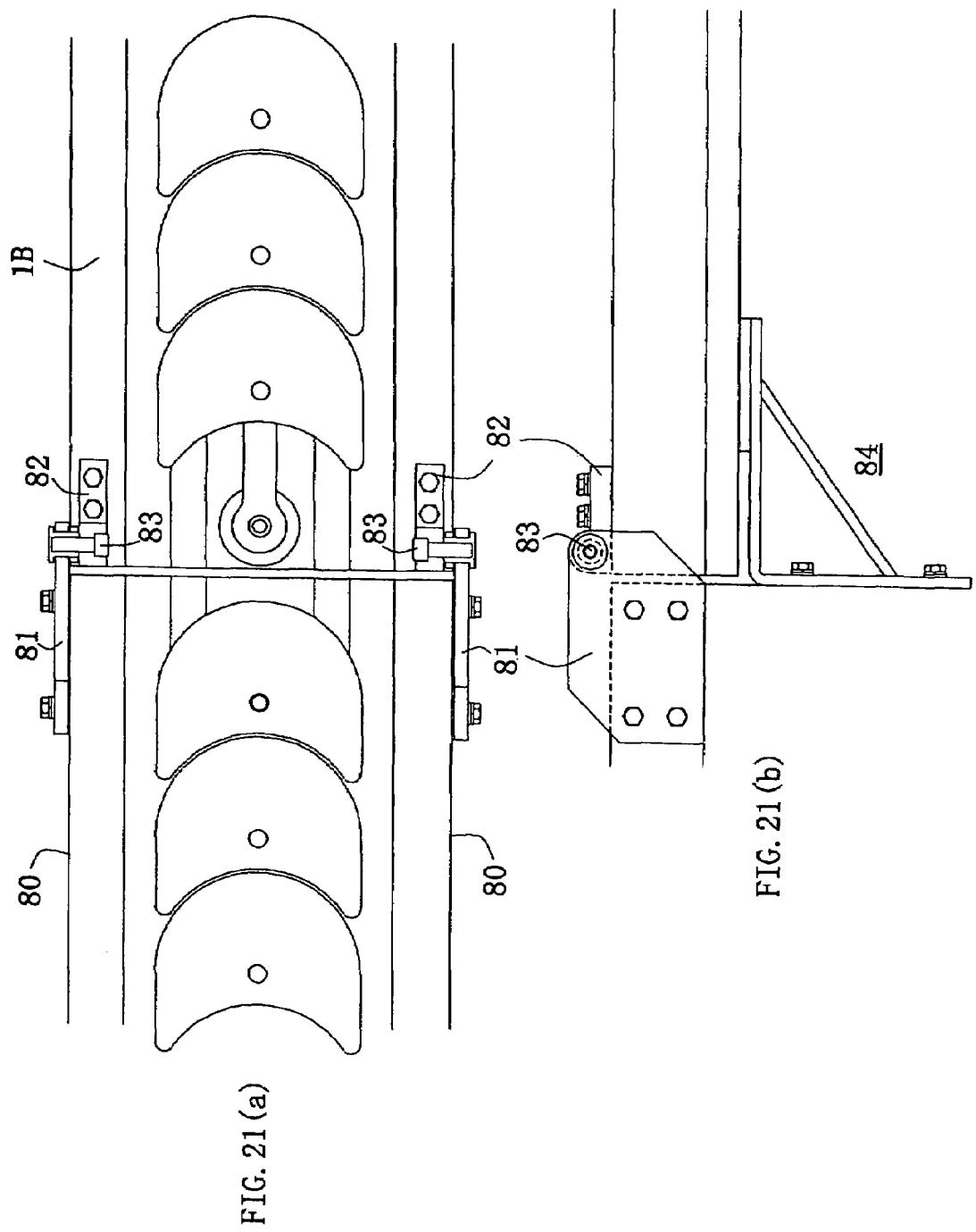
FIGS. 21A and 21B are views showing the details of part of FIG. 20A.

FIGS. 21A and 21B show the foldable lane 1B of FIG. 20A in detail. A plate 81 is attached to the side 80 of the traveling lane 1 while a plate 82 is attached to the foldable lane 1B arranged at the gate 52. The distal end of a pin 83 fixed to the plate 82 is loosely fitted into a through hole of the plate 81, and thereby, hinge mechanism is formed. The foldable lane 1B is supported by a triangular support member 84.

It is further understood by those skilled in the art that the foregoing description is a preferred embodiment of the disclosed equipment and that various changes and modifications may be made in the invention without departing from the spirit and scope thereof.

What is claimed is:

1. A circulating type food and drink transport apparatus comprising:
    a circular link chain;
    a plurality of plates located on the link chain with a predetermined clearance;
    a traveling lane guiding and carrying the link chain;
    a substantially U-shaped rubbish receiver closing the lower portion of the traveling lane and having a discharge port, the receiver being inclined in a direction toward the discharge port; and
    a discharge pipe connected with the discharge port so as to receive foreign matter on the receiver.

2. The circulating type food and drink transport apparatus according to claim 1, wherein
    the link chain includes a chain driving section arranged a corner of the traveling lane and a chain driven section arranged at another corner of the traveling lane, and a circular operation is made by the chain driving section and the chain driven section, and
    the chain driving section and the chain driven section are movable in accordance with a manual operation.

3. The circulating food and drink transport apparatus according to claim 1, wherein
    the link chain is configured by a plurality of chain units all having the same structure.

4. The circulating food and drink transport apparatus according to claim 1, wherein
    the link chain includes a series of chain units having the same structure and a separable chain unit arranged at a proper position of the series of chain units.

5. The circulating food and drink transport apparatus according to claim 4, wherein
    the separable chain unit is configured by an upper plate, a lower link arm, a hollow shaft connecting lower and upper link arms, and a roller rotating around the hollow shaft, and
    a link pin connecting the upper plate and the lower link arm has separable upper and lower portions.

6. The circulating food and drink transport apparatus according to claim 1, wherein
    part of the traveling lane is upwardly and downwardly foldable by the rotation around a hinge.

* * * * *